United States Patent
Hong et al.

(10) Patent No.: US 8,434,159 B2
(45) Date of Patent: Apr. 30, 2013

(54) AFM MEASURING METHOD AND SYSTEM THEREOF

(75) Inventors: Jae Wan Hong, Seoul (KR); Won Young Song, Incheon (KR)

(73) Assignee: Nanofocus, Inc., Seoul (KR)

( * ) Notice: Subject to any disclaimer, the term of this patent is extended or adjusted under 35 U.S.C. 154(b) by 0 days.

(21) Appl. No.: 13/378,514

(22) PCT Filed: Apr. 5, 2010

(86) PCT No.: PCT/KR2010/002073
§ 371 (c)(1),
(2), (4) Date: Dec. 15, 2011

(87) PCT Pub. No.: WO2010/147296
PCT Pub. Date: Dec. 23, 2010

(65) Prior Publication Data
US 2012/0117695 A1    May 10, 2012

(30) Foreign Application Priority Data
Jun. 17, 2009 (KR) .................. 10-2009-0053911

(51) Int. Cl.
*G01Q 60/24*   (2010.01)
(52) U.S. Cl.
USPC ........... 850/33; 850/1; 850/4; 850/62; 850/63
(58) Field of Classification Search .................. 850/1, 4, 850/33, 62, 63
See application file for complete search history.

(56) References Cited

U.S. PATENT DOCUMENTS

| | | | |
|---|---|---|---|
| 6,850,323 B2 * | 2/2005 | Anderson | 356/301 |
| 6,985,223 B2 * | 1/2006 | Drachev et al. | 356/301 |
| 7,241,994 B2 | 7/2007 | Hasegawa et al. | |
| 2007/0091977 A1 | 4/2007 | Sohn et al. | |
| 2011/0010808 A1* | 1/2011 | Barrios et al. | 850/32 |

FOREIGN PATENT DOCUMENTS

| | | |
|---|---|---|
| JP | 10-214868 A | 8/1998 |
| KR | 10-2004-0096530 A | 11/2004 |
| KR | 10-2006-0002299 A | 1/2006 |
| KR | 10-2006-0078917 A | 7/2006 |

OTHER PUBLICATIONS

International Search Report issued in corresponding application, PCT/KR2010/002073, dated Jun. 29, 2010.

* cited by examiner

*Primary Examiner* — Michael Logie
(74) *Attorney, Agent, or Firm* — Lee & Morse, P.C.

(57) ABSTRACT

Provided are an AFM measuring method and a system thereof. The tip of a cantilever is provided to a plurality of points on a substrate, to which incident light is radiated from a light source. Scattered light is generated between the tip of the cantilever and the substrate by the incident light and the intensity of the scattered light is measured. The measured intensity of the scattered light is input to a data processing unit so as to find a point where the intensity of the incident is highest. The tip of the cantilever is moved to the point where the intensity of the incident light is highest.

10 Claims, 4 Drawing Sheets

AFM MEASURING METHOD AND SYSTEM THEREOF

FIELD

Embodiments relate to an AFM and, more particular to, an AFM measuring method and a scanning system thereof.

DESCRIPTION OF RELATED ART

An Atomic Force Microscope (AFM) is a high-precise surface analysis apparatus which measures a shape of a surface of a sample in atomic scale by using an interaction force between the atoms. A cantilever for measuring the sample is installed in the AFM, a tapered probe or tip is disposed at an end portion of the cantilever, and an end of the probe has a size of several atoms (several nanometers) to be very sharp. If the probe is approached to the surface of the sample, an attractive force or a repulsive force acts between atoms of the end of the probe and atoms of the surface of the sample according to a distance between the atoms of the end of the probe and the atoms of the surface of the sample.

The AFM is used in a roughness measurement of a surface in semiconductor processes, or in a defect measurement of a chip or a mask. However, the AFM does not have a chemical selectivity, so that the AFM could not distinguish a chemical characteristic of the sample. Recently, researches have been conducted for providing the chemical selectivity to the AFM through a combination of the AFM and an optical microscope or a chemical treatment of the tip of the AFM. One method thereof uses a Raman Spectroscopy method.

When light passes through a medium, a portion of the light is scattered to proceed in a direction different from a proceeding direction of the light. The scattered light may have an original energy or may have energy greater than or less than the original energy. A process that the portion of the light is scattered to maintain the original energy is defined as 'Rayleigh scattering', and a process that the portion of the light is scattered to loss or gain energy is defined as 'Raman scattering (or inelastic scattering)'. When a molecule receives light, the molecule is excited in an excited vibration state and the molecule of the excited vibration state returns to a ground state through three methods. First, when the excited molecule radiates the whole energy of an incident light source to return to the ground state, a light having the same energy as that of the incident light source is scattered to be irradiated. This case is the Rayleigh scattering. Alternatively, the Raman scattering means a case that the molecule returns the ground stated after the molecule absorbs or radiates the same energy as the vibrational energy of the molecule. At this time, an electron state is not changed but a transition of a vibration state occurs. A case that the molecule returns to the ground state after the molecule absorbs the vibrational energy is referred to as 'Strokes effect'. At this time, since energy of a radiant ray is absorbed by the molecule, the light having energy less than that of the incident light source (i.e., the light having a wavelength longer than that of the incident light source) is scattered. Alternatively, a case that the molecule returns to the ground state after the molecule radiates the vibrational energy is referred to as 'Anti-strokes effect'. In this case, since the radiant ray gets energy from the molecule, the light having energy greater than that of the incident light source (i.e., the light having a wavelength shorter than that of the incident light source) is scattered. An energy exchange between the incident light source and a material occurs through the Raman scattering process. The energy absorbed or radiated by the material is closely related with a molecular structure constituting the material and the scattered light according to the Raman scattering is a property depending on a material. Thus, if the scattered light is analyzed, the molecular structure of the material is inferred. Generally, the above change may be measured by observing an energy loss amount or an energy gain amount of the light between before and after the scattering. A shift of spectrum between before and after the scattering is referred to as 'Raman shift'. The Raman shift corresponds to a vibrational frequency of the molecule. If a Raman spectroscope is combined with the AFM, an amplified Raman signal is generated in a limited region contacting the probe of the AFM to enable a Raman spectrum analysis of high resolution. The above method is referred to as 'Tip-Enhances Raman Spectroscopy (TERS).

DETAILED DESCRIPTION OF INVENTION

The present invention provides an AFM measuring method capable of scanning in a state that a tip of a cantilever is located at a point where the intensity of an incident light is highest.

The present invention is not limited to the above purpose, those skilled in the art can understand other purposes from following embodiments.

According to embodiments of the present invention, an AFM measuring method includes: providing a tip of a cantilever on a plurality of points on a substrate which an incident light is radiated from a light source to; measuring an intensity of scattered light which is generated between the tip of the cantilever and the substrate by the incident light; inputting the intensity of the scattered light into a data processing unit to find a point where the intensity of the incident light is highest; and moving the tip of the cantilever on the point where the intensity of the incident light is highest.

In some embodiments, the method may further include measuring the substrate by moving the substrate in a state that a relative location of the tip of the cantilever and the light source is fixed.

In other embodiments, the data processing unit may find the point, where the intensity of the incident light is highest, using Gaussian function.

In still other embodiments, the data processing unit may apply the plurality of points and the intensities of the scattered light in the plurality of points to the Gaussian function to find the point where the intensity of the incident light is highest.

In yet other embodiments, providing the tip of the cantilever on the plurality of points may include: radiating the incident light to the tip of the cantilever; and moving the cantilever in a state that the incident light is fixed.

According to embodiments of the present invention, an AFM measuring system includes: a light source; a measuring unit including a cantilever and a tip provided to an end portion of the cantilever; a driving unit moving the cantilever on a plurality of points on a substrate which an incident light is radiated from a light source; a sensor measuring an intensity of scattered light generated between the tip of the cantilever and the substrate; and a data processing unit inputted with the intensity of the scattered light to find a point where the intensity of the incident light is highest.

In some embodiments, the tip of the cantilever may be surface treated by a metal material.

In other embodiments, the driving unit may be configured to move the tip on the point where the intensity of the incident light is highest.

In still other embodiments, the data processing unit may be configured to use Gaussian function to find the point where the intensity of the incident light is highest.

In yet other embodiments, the data processing unit may be configured to apply the plurality of points and the intensities of the scattered light in the plurality of points to the Gaussian function to find the point where the intensity of the incident light is highest.

The measure object may be scanned in the state that the tip of the cantilever is located on the point where the intensity of the incident light is highest, thereby performing the AFM scanning in more detail.

DETAILED DESCRIPTION

Figure 1:
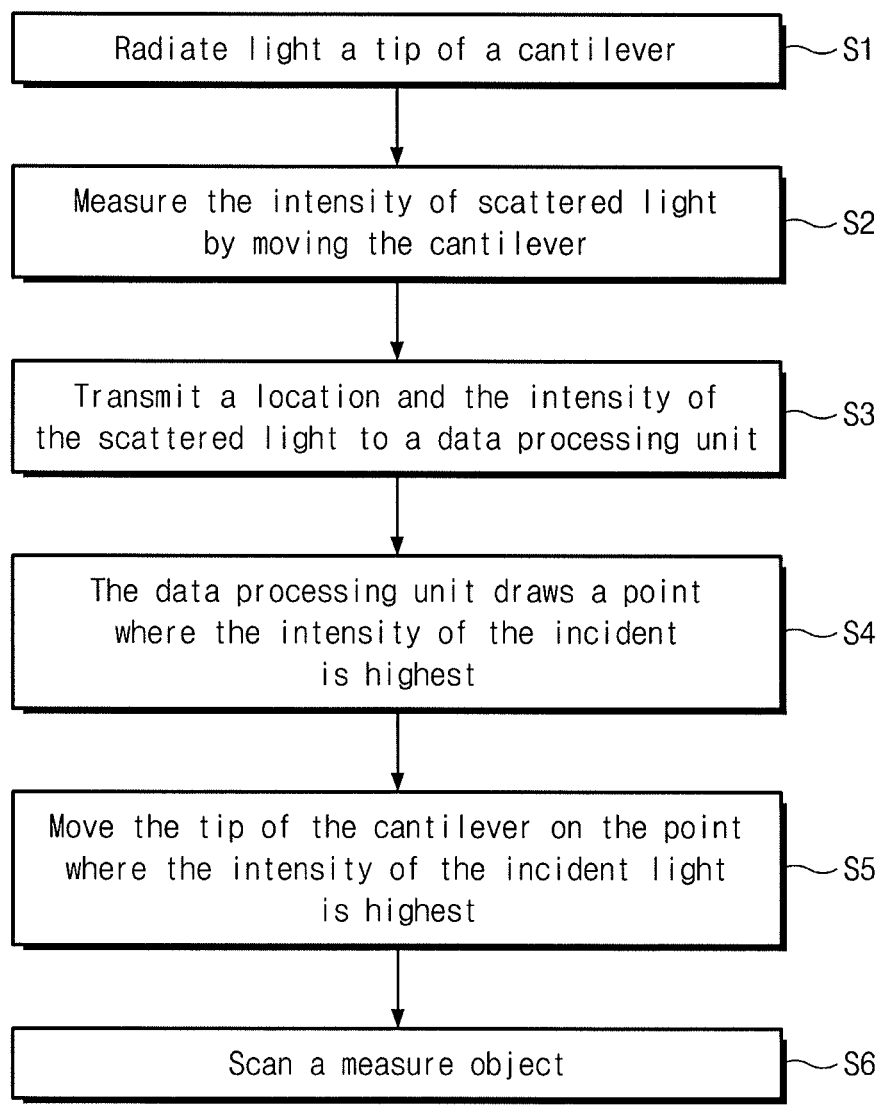
FIG. 1 a process flow chart of an AFM measuring method according to an embodiment.

The advantages and features of the present invention and methods of achieving them will be apparent from the following exemplary embodiments that will be described in more detail with reference to the accompanying drawings. It should be noted, however, that the present invention is not limited to the following exemplary embodiments, and may be implemented in various forms. Accordingly, the exemplary embodiments are provided only to disclose the present invention and let those skilled in the art know the category of the present invention. In the drawings, embodiments of the present invention are not limited to the specific examples provided herein and are exaggerated for clarity. The same reference numerals or the same reference designators denote the same elements throughout the specification.

It will be also understood that although the terms first, second, third etc. may be used herein to describe various elements, these elements should not be limited by these terms. These terms are only used to distinguish one element from another element.

It will be further understood that the terms may are only used to describe embodiments and not to limit the scope of claims. Herein, the singular forms are intended to include the plural forms as well, unless the context clearly indicates otherwise. It will be further understood that the terms "comprises" and/or "comprising,", when used herein, specify the presence of stated features, integers, steps, operations, and/or components, but do not preclude the presence or addition of one or more other features, integers, steps, operations, and/or components.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

FIG. 1 is a flow chart to explain an AFM measuring method according to an exemplary embodiment of the present invention. FIGS. 2 to 5 are views to explain an AFM measuring system according to an exemplary embodiment of the present invention.

Figure 2:
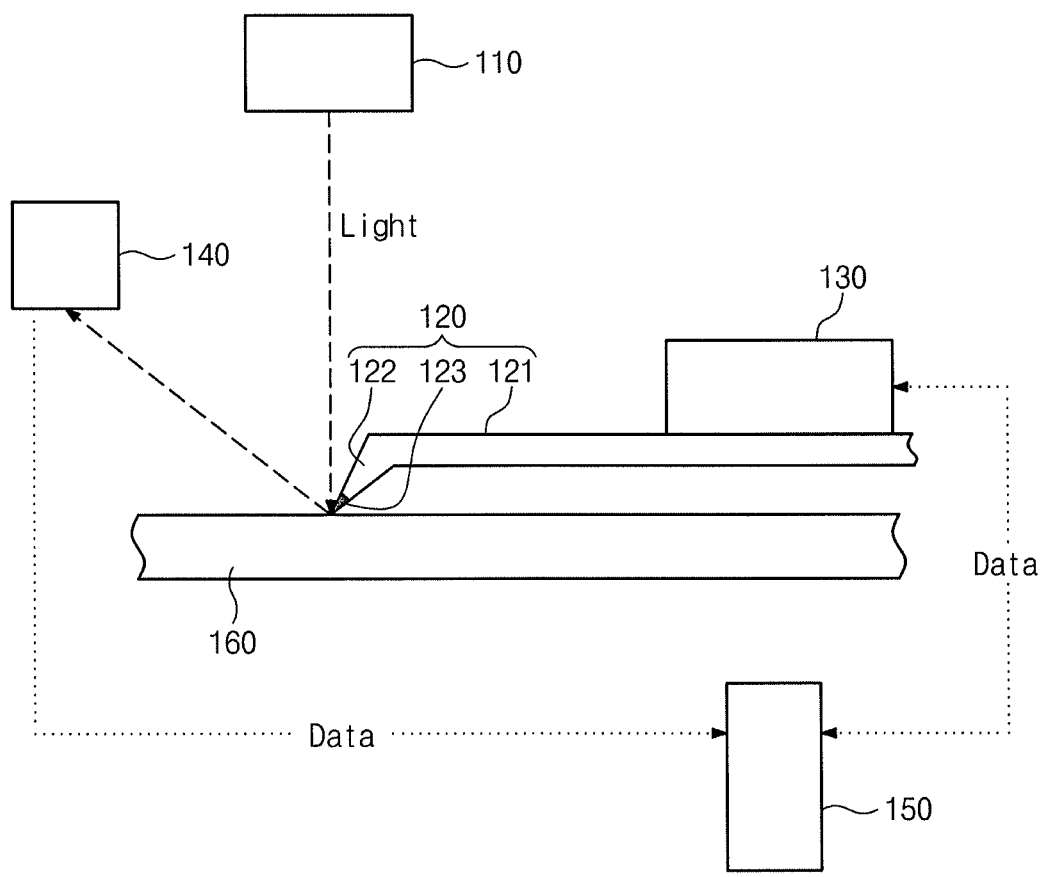
FIG. 2 is a view illustrating an AFM measuring system according to an embodiment.

Referring to FIGS. 1 and 2, light is radiated to a tip 122 of a cantilever 121 (S1). The light may be generated in a light source 110. The light source 110 may be a laser light source. For example, the light source 110 may be a neodymium-doped yttrium aluminum ganet laser (Nd: YAG laser) or a Ti: sapphire laser. The light generated in the light source 110 may be radiated on the cantilever 121 through a splitter (not shown) to be used in a measurement of a movement of the cantilever 121 during a scanning of a substrate described below.

The light generated in the light source 110 arrives at a measuring unit 120. The measuring unit 120 includes the cantilever 121. The tip 122 may be provided at an end portion of the cantilever 121. For example, a shape of the tip 122 may be a triangular pyramid, a quadrangular pyramid, or a circular cone. An end portion of the tip 122 may be very sharp in a size of several atoms. If the tip 122 is approached to a surface of a measure object, an attractive force or a repulsive force acts between atoms of the tip 122 and atoms of the surface of the measure object. The end portion of the tip 122 may be surface treated by a metal material 123 for a Raman scattering. For example, the metal material 123 may be gold (Au) or silver (Ag). In other embodiments of the present invention, the tip 122 may be formed of the metal material 123 for the Raman scattering. Since amplitude of the Raman scattering is very less than that of a fluorescence or infrared spectrum, it is required to amplify a Raman signal itself. Since the metal material 123 is locally formed at the end portion of the tip 122, a region of the Raman scattering is limited to increase sensitivity and resolution during the measurement of the measure object described below.

A width of the light generated in the light source 110 is generally greater than a size of the metal material 123 formed at the end portion of the tip 122. The resolution can be improved by focusing of the light using a lens. However, the focusing of the light caused by an optical method may have a limit. In some embodiments of the present invention, since the end portion of the tip 122 is positioned at a region having the highest intensity within an incident light region of the measure object in which the light arrives, it is possible to increase the sensitivity and the resolution of the measurement.

Scattered light generated between the metal material 123 and the substrate 160 may be measured in a sensor 140. The substrate 160 is not limited to a semiconductor substrate, and the substrate 160 may be any kind of measure objects. The sensor 140 may measure intensity of a changed wavelength of light between before and after the scattering generated between the substrate 160 and the metal material 123.

Referring to FIG. 1, the intensities of the changed wavelengths of the light between before and after the scattering are measured in a plurality of locations by moving the cantilever 121 (S2). The cantilever 121 may be moved by a driving unit 130. The driving unit 130 may finely move the measuring unit 120. The driving unit 130 may be a piezo-electric device. The tip 122 may measure intensities of the scattered lights in different points located on the substrate 160 by the driving unit 130, thereby obtaining data of intensities.

Figure 3:
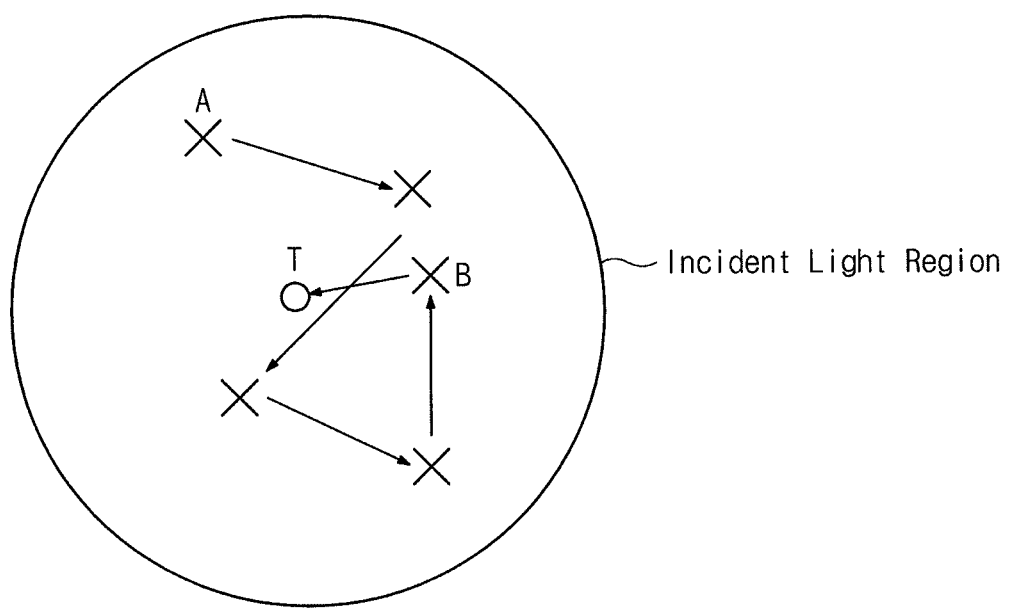
FIGS. 3 and 4 are views illustrating movement paths of a tip of a cantilever according to an embodiment.
Figure 4:
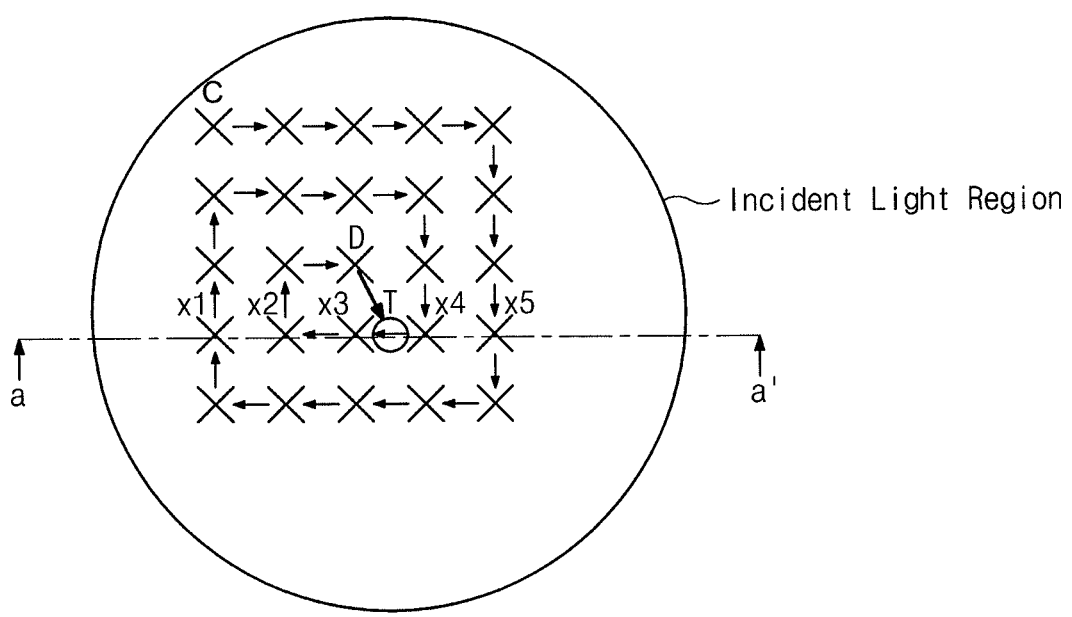
Figure 5:
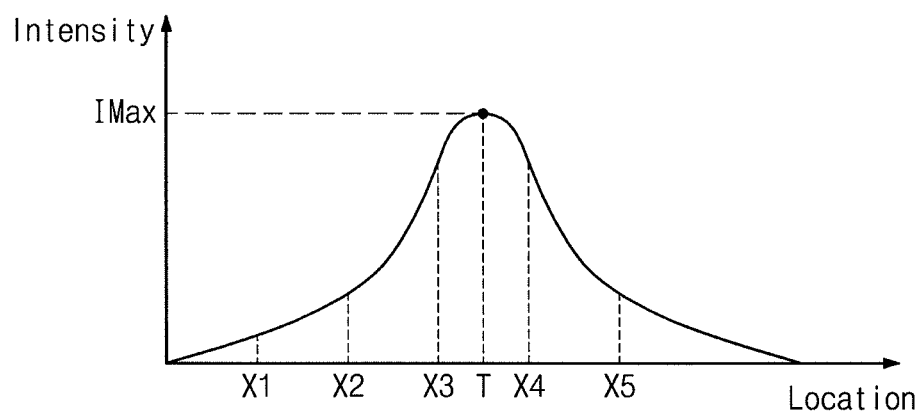
FIG. 5 is a graph illustrating an intensity distribution of scattered light according to a line a-a' of the FIG. 4.

Referring to FIGS. 3 to 5, movement paths of the tip 122 are shown. The movement path of the tip 122 may be any path capable of obtaining the intensities of the scattered lights within the incident light region. In some embodiments of the present invention, as illustrated in FIG. 3, the tip 122 is moved from a point A to a point B via several points at random intervals and in random directions to obtain data for five points. In other embodiments of the present invention, as illustrated in FIG. 4, the tip 122 is moved from a point C (i.e., a point in which the tip 122 is initially located) to a point D via a plurality of points at a predetermined interval to obtain data for 25 points. FIG. 5 is a graph illustrating an intensity distribution of scattered light according to a line a-a' of the FIG. 4. The intensity distribution of the scattered light may have a shape of a three-dimensional Gaussian function.

Referring to FIGS. 1 to 5, the data may be transmitted to a data processing unit 150 (S3). The data processing unit 150 may draw a point T, where the intensity of the incident light is highest, within the incident light region from the data. In some embodiments, the method of drawing the point T where the intensity of the incident light is highest may use Gaussian function (S4). In some embodiments, if the intensity of the scattered light is great, the intensity of the incident light is great. Thus, the location of the tip 122 on the substrate 160 and the intensity of scattered light in the location of the tip may be measured, and then the measured values may be applied to the Gaussian function to draw the point T, where the intensity of the incident light is highest (i.e., a peak of a Gaussian function graph).

Continuously referring to FIGS. 1 to 5, the tip 122 of the cantilever 121 is moved on the point T where the intensity of the incident light is highest (S5). In this case, a relative location of the light source 110 may be fixed. When the tip 122 of the cantilever 121 is moved on the point T where the intensity of the incident light is highest, the sensitivity and the resolution may be increase when scanning the substrate 160 described below. By the driving unit 130, the tip 122 of the cantilever 121 may be moved on the point T where the intensity of the incident light is highest.

Referring again to FIG. 1, the substrate 160 may be scanned in the state that the tip 122 of the cantilever 121 is fixed on the point T where the intensity of the incident light is highest (S6). The scanning may be performed by moving the substrate 160 in the state that the relative location of the tip of 122 of the cantilever 121 and the light source 110 is fixed. In other embodiments, the tip 122 and the light 110 may be moved simultaneously to scan the substrate 160 in the state that the relative location of the tip of 122 of the cantilever 121 and the light source 110 is fixed The measure object may be scanned in the state that the tip of the cantilever is located on the point where the intensity of the incident light is highest, thereby performing the AFM scanning in more detail.

While the present invention has been described with reference to example embodiments, it will be apparent to those skilled in the art that various changes and modifications may be made without departing from the spirit and scope of the present invention. Therefore, it should be understood that the above embodiments are not limiting, but illustrative.

What is claimed is:

1. An AFM measuring method, comprising:
providing a tip of a cantilever on a plurality of points on a substrate which an incident light is radiated from a light source;
measuring an intensity of scattered light which is generated between the tip of the cantilever and the substrate by the incident light;
inputting the intensity of the scattered light into a data processing unit to find a point where the intensity of the incident light is highest; and
moving the tip of the cantilever on the point where the intensity of the incident light is highest.

2. The AFM measuring method of claim 1, further comprising:
measuring the substrate by moving the substrate in a state that a relative location of the tip of the cantilever and the light source is fixed.

3. The AFM measuring method of claim 2, wherein the data processing unit finds the point, where the intensity of the incident light is highest, using Gaussian function.

4. The AFM measuring method of claim 3, wherein the data processing unit applies the plurality of points and the intensities of the scattered light in the plurality of points to the Gaussian function to find the point where the intensity of the incident light is highest.

5. The AFM measuring method of claim 1, wherein providing the tip of the cantilever on the plurality of points comprises:
radiating the incident light to the tip of the cantilever; and
moving the cantilever in a state that the incident light is fixed.

6. An AFM measuring system, comprising:
a light source;
a measuring unit including a cantilever and a tip provided to an end portion of the cantilever;
a driving unit moving the cantilever on a plurality of points on a substrate which an incident light is radiated from a light source;
a sensor measuring an intensity of scattered light generated between the tip of the cantilever and the substrate; and
a data processing unit inputted with the intensity of the scattered light to find a point where the intensity of the incident light is highest.

7. The AFM measuring system of claim 6, wherein the tip of the cantilever is surface treated by a metal material.

8. The AFM measuring system of claim 7, wherein the driving unit is configured to move the tip on the point where the intensity of the incident light is highest.

9. The AFM measuring system of claim 8, wherein the data processing unit is configured to use Gaussian function to find the point where the intensity of the incident light is highest.

10. The AFM measuring system of claim 9, wherein the data processing unit is configured to apply the plurality of points and the intensities of the scattered light in the plurality of points to the Gaussian function to find the point where the intensity of the incident light is highest.

* * * * *